United States Patent
Burstyn et al.

(10) Patent No.: US 7,324,646 B1
(45) Date of Patent: Jan. 29, 2008

(54) METHOD AND APPARATUS FOR FILM ANTI-PIRACY

(75) Inventors: Herschel Clement Burstyn, Princeton, NJ (US); George Herbert Needham Riddle, Princeton, NJ (US); Leon Shapiro, Lawrenceville, NJ (US); David Lloyd Staebler, Washington, NJ (US)

(73) Assignee: Sarnoff Corporation, Princeton, NJ (US)

( * ) Notice: Subject to any disclaimer, the term of this patent is extended or adjusted under 35 U.S.C. 154(b) by 656 days.

(21) Appl. No.: 09/592,472

(22) Filed: Jun. 9, 2000

Related U.S. Application Data

(60) Provisional application No. 60/195,612, filed on Apr. 6, 2000, provisional application No. 60/188,897, filed on Mar. 13, 2000, provisional application No. 60/178,618, filed on Jan. 28, 2000, provisional application No. 60/162,553, filed on Oct. 29, 1999.

(51) Int. Cl.
*H04K 1/02* (2006.01)

(52) U.S. Cl. ..................... 380/252; 380/211

(58) Field of Classification Search ............... 380/210; 348/744, 750
See application file for complete search history.

(56) References Cited

U.S. PATENT DOCUMENTS

| | | | |
|---|---|---|---|
| 4,964,162 A * | 10/1990 | McAdam et al. ........... 380/215 |
| 5,394,274 A * | 2/1995 | Kahn ........................... 360/27 |
| 5,515,107 A | 5/1996 | Chiang et al. | |
| 5,621,794 A | 4/1997 | Matsuda et al. | |
| 5,680,454 A * | 10/1997 | Mead ........................ 380/204 |
| 5,737,417 A | 4/1998 | Buynak et al. | |
| 5,883,959 A | 3/1999 | Kori | |
| 5,894,518 A | 4/1999 | Shiojiri | |
| 5,900,886 A | 5/1999 | Shay | |
| 5,959,717 A | 9/1999 | Chaum | |
| 5,982,416 A | 11/1999 | Ishii et al. | |
| 6,018,374 A * | 1/2000 | Wrobleski .................. 348/744 |
| 6,021,199 A | 2/2000 | Ishibashi | |
| 6,026,193 A | 2/2000 | Rhoads | |
| 6,037,984 A | 3/2000 | Isnardi et al. | |
| 6,041,158 A * | 3/2000 | Sato ............................. 386/1 |
| 6,122,403 A * | 9/2000 | Rhoads ....................... 382/233 |
| 6,173,109 B1 | 1/2001 | Quan | |
| 6,314,192 B1 | 11/2001 | Chen et al. | |
| 6,529,600 B1 * | 3/2003 | Epstein et al. ............. 380/252 |
| 6,809,792 B1 * | 10/2004 | Tehranchi et al. ............ 352/85 |

FOREIGN PATENT DOCUMENTS

| | | |
|---|---|---|
| EP | 0519320 | 12/1992 |
| EP | 0851678 | 7/1998 |
| WO | 0074366 | 12/2000 |

* cited by examiner

*Primary Examiner*—Nasser Moazzami
*Assistant Examiner*—Brandon Hoffman
(74) *Attorney, Agent, or Firm*—Lowenstein Sandler PC

(57) ABSTRACT

A method and apparatus is disclosed for introducing alterations or distortions in projected images. The distortions on the projected image are imperceptible to a human viewer. The distortions are recorded on recording devices and observable upon viewing the recorded images.

16 Claims, 7 Drawing Sheets

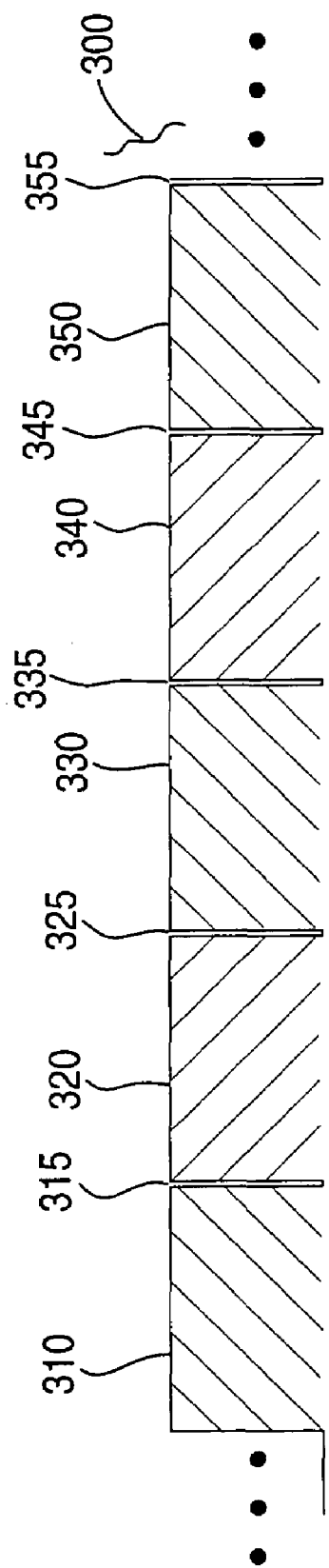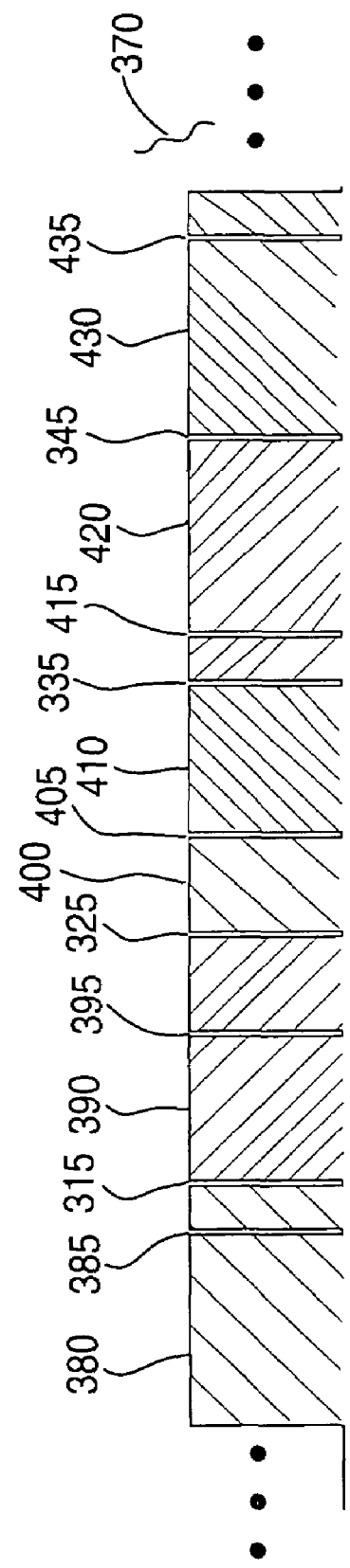
FIG. 1A
FIG. 1B

METHOD AND APPARATUS FOR FILM ANTI-PIRACY

CROSS REFERENCE TO RELATED APPLICATIONS

This application relates to Provisional Application Ser. No. 60/162,553, entitled, "ANTI-CINEMA PIRACY," filed on Oct. 29, 1999, Provisional Application Ser. No. 60/178,618, entitled "ANTI-CINEMA PIRACY," filed on Jan. 28, 2000, Provisional Application Ser. No. 60/188,897, entitled "ANTI-PIRACY USING CHROMATIC AND INTENSITY FLICKER MEASURES," filed on Mar. 13, 2000 and Provisional Application Ser. No. 60/195,612 entitled "ANTI-PIRACY AND WATERMARK TECHNOLOGY," filed on Apr. 6, 2000, which are assigned to the same assignee and are incorporated by reference herein. Applicants claim the benefit of the priority filing dates of Oct. 29, 1999, Jan. 28, 2000, Mar. 13, 2000 and Apr. 6, 2000 pursuant to 35 U.S.C. § 119(e)(1).

FIELD OF THE INVENTION

The invention is related to the field of film and video projection, and more particularly to preventing the illegal recording of film and video.

BACKGROUND OF THE INVENTION

Each year the film industry loses millions of dollars in revenue due to the illegal copying and reselling of movies. Movie pirates illegally copy movies by capturing the projected image with a video-recording device, such as a camcorder. Camcorders can be used in a dark movie theater to illegally record both the projected image and the corresponding audio. The illegal copy of the image, recorded on videotape, can be repeatedly recopied and sold to the public. Movie pirates often package these illegal copies in a manner to cause a purchaser to believe that a legitimate copy of the movie has been purchased.

In response to widespread film piracy, there have been various methods attempted to distort the projected image such that an illegal copy is unpleasant to view. No acceptable method exists, however, for adding distortion without unacceptably degrading the projected image as it plays to the legitimate viewers. There is a need, therefore, for a system and method for distorting an illegally recorded image, while still maintaining a high quality image for the legitimate viewing audience.

SUMMARY OF THE INVENTION

A film anti-piracy system according to the principles of the invention introduces distortion into an illegally copied image, while maintaining a high quality image for viewing by the legitimate audience. Examples of distorting signals are temporal intensity, chromatic spatial modulation, and those formed by spatial modulation of chromatic, intensity and temporal effects. The distorting or interfering signal is substantially invisible to the viewing audience as the frequency of the interfering signal renders the interference imperceptible to a human viewer. A camcorder or other video-recording device, however, records the distortion. The frequency of the distorting signal has a value such that the difference between the distorting signal frequency and the recording camera frame rate is within a viewable range. Upon playback of the recorded image, the viewer experiences the distortion.

In one embodiment of the invention, a shutter is interposed between a projector and the screen. The shutter interrupts the projection at a frequency that renders the interruption unnoticeable to a viewer. A video-recording device records the distorted image at a given frame rate. The absolute value of the difference between the recording camera frame rate and distorting shutter frequency induces a beat frequency in the observable range. When the recorded image is played, the playback image distorts at the beat frequency.

BRIEF DESCRIPTION OF THE DRAWINGS

The features of the invention will appear more fully upon consideration of the embodiments to be described in detail in connection with the accompanying drawings, in which:

FIGS. 1A and 1B are timing diagrams for a film projector and a video recorder;

DETAILED DESCRIPTION

Figure 2:
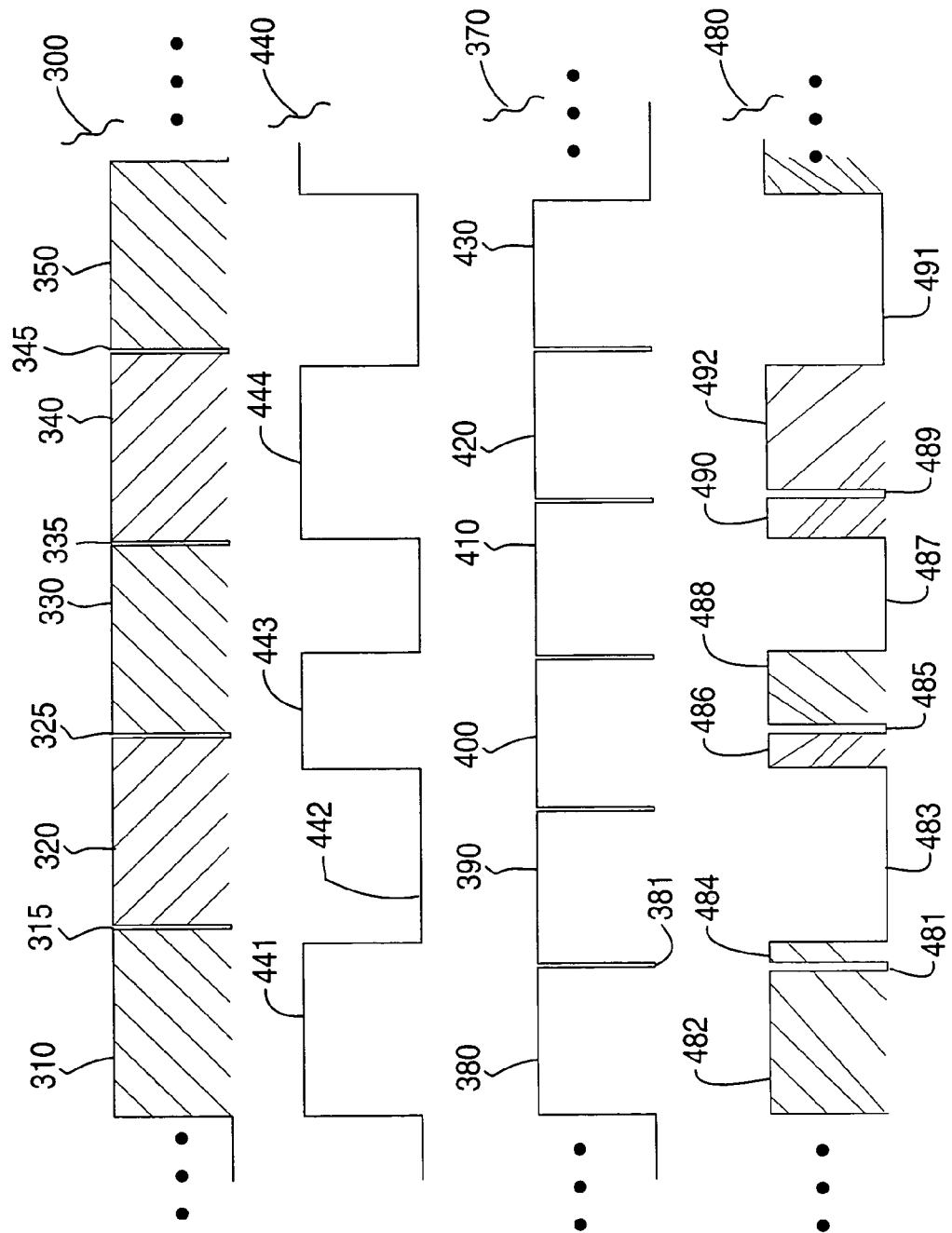
FIG. 2 illustrates a timing diagram for distorting a recorded image according to the principles of the invention.

This detailed description sets forth exemplary methods and systems for distorting an image recorded from a projected film or video without appreciably degrading the projected information. An exemplary system introduces a distorting signal to the projected image that is substantially imperceptible to a viewer. When a recording camera records the projected image, the recording camera frame rate and the distorting signal frequency induce a beat frequency in the observable range. A viewable distortion appears at the beat frequency during playback of the recorded image.

A. Projection and Recording

Projecting a series of slightly different images that are changed at a rate faster than is perceived by the eye creates motion pictures. The eye ignores the disruption in the projected image by integrating a previous image with a subsequent image. In FIG. 1A, a film projector timing diagram 300 illustrates the projection of individual images within five frames 310, 320, 330, 340 and 350. In this example, a first image is projected for a finite time, as represented by frame 310. The image changes at the conclusion of the frame time. To make this change, the projected image is interrupted for a short time, as illustrated by interval 315. During the interval 315, a second image is prepared for projection, such as by placing image data before the projector light source (not shown). The second image is projected for the duration of the second frame, as at 320. At the conclusion of this frame 320, the projected image is again interrupted to change to a third image. The interruption time is represented by interval 325. For each image contained on the film there is a projection period and a corresponding interruption period. The interruptions are represented in the timing diagram 300 at 325, 335, 345 and 355.

The projection can be characterized by various parameters, including the frame rate and the duty cycle. For the projection represented in diagram 300, the effective frame rate is 24 frames per second. (The actual frame rate is 48 frames per second, but the same image is projected twice). The projection to interruption ratio in each frame is known as the duty cycle, which impacts perceived brightness and the strength of the interference in the recorded image. Viewers cannot discern distinct frames when the frame rate exceeds a certain frequency. The eye retains the previous image and integrates it with the next image. Because the images are slightly different, the audience sees motion.

A video-recording device operates similarly to a film or video projector (images are recorded during finite periods). FIG. 1B illustrates a video recording timing diagram 370, where the recording device records image data during finite periods. The field exposures occur at a regular rate, such as 60 Hz for NTSC (National Television Standards Committee) and 50 Hz for PAL (Phase Alternating Line). In NTSC, video recording occurs at 30 frames per second, as two interlaced (odd line and even line) scans of an image are recorded in each cycle. This rate can be controlled by, for example, a mechanical or electronic shutter, which is closed for only a fraction of each field. In the diagram 370, image data is recorded in the frames shown at 380, 390, 400, 410, 420 and 430, with non-recording periods shown at 385, 395, 405, 415 and 435. During the playback of the recorded image, the interruptions of the recorded image remain undetected, because the eye integrates the image from one field to the next.

FIGS. 1A and 1B also illustrate the recording of a projected image by a video-recording device. A first image, projected during frame 310, is recorded in frame 380 and partially in frame 390. A second image, projected during frame 320, is recorded partially in frame 390 and partially in frame 400. As an interruption in film projection occurred between frames 310 and 320, frame 390 not only records the projected first and second images, but also records the lack of image data during the interruption 315. Similarly, frame 400, which records image data from second frame 320 and third frame 330, also records the lack of image data during an interruption 325. Accordingly, the recorded image is not only interrupted by its own internal framing mechanism, but the projector timing also interrupts the recorded image. Because, however, the interruption periods are less than the retention period of the eye, the interruptions in the recorded image are unobserved by the viewer during playback. The quality of the video-recorded image is comparable to the quality of the original projected image.

B. Inducing A Distorted Image

FIG. 2 illustrates timing diagrams 300, 440, 370 and 480 for distorting a recorded image according to the principles of the invention. Referring to the timing diagram for the projected image 300, the image is projected at 24 frames per second, and is represented by the frames 310, 320, 330, 340 and 350 (as in FIG. 1A). An interfering signal timing diagram 440 represents the timing of a disrupting or interfering signal. In this case, the disruption is a blanking of the projected image 300, though other types of interference can be used. When the waveform is high, as at 441, interference is imparted to the projected image. When the waveform is low, as at 442, there is no interference present.

The frequency and the duty cycle of the interference signal 440 are set so that the viewing audience does not perceive the interference. In this example, the duty cycle is approximately 50%. Since the eye integrates the projected information, the interfering signal reduces the perceived brightness (amplitude) of the projected image. As long as the interfering signal frequency is sufficiently fast (e.g., over 60 Hz), the interfering signal is imperceptible to a human viewer.

Further illustrated in FIG. 2 is a timing diagram 370 for a recording device. The recording device frame rate is thirty frames per second, which is common for a camcorder. The recorder records when the waveform is high, as at 380, and does not record when the waveform is low, as at 381. Unlike the human eye, a video recorder integrates only over the taking time. Accordingly, only the projected images present when the recording waveform 370 is high (380, 390, 400, 410, 420 and 430) are recorded on the recorder. The recorded signal timing waveform 480 illustrates the altered or disrupted images recorded by the recorder. When the waveform is high, as at 482, 484, etc., the image is recorded. When the waveform is low, as at 481, 483, 485, 487, 489 and 491, no image information is recorded.

During playback, the disruptions in the recorded image cause changes in the intensity of the playback image. The periods of substantially zero intensity, as at 481, 483, 485, 487, 489 and 491, occur when the waveform is low. This results in a periodic darkening of the playback image. The intensity changes occur at a frequency that is the difference between the frequency of the interfering signal 440 and the recorder frame frequency 370 (referred to as the beat frequency). The recorded image plays back with periods of zero information occurring at the beat frequency between the interfering signal 440 and the camera frame rate 370. The fading and intensifying of the brightness of the playback image is unpleasant to view.

The frequency and the duty cycle of the interfering signal can be varied to correspondingly vary alteration of the recorded image without substantially altering the quality of the projected image. For example, for a recording rate of 60 Hz (NTSC), an interference signal rate of 67 Hz introduces a distortion at a beat frequency of 7 Hz into a recorded image. For NTSC recording, beat frequencies at least in the range of 0.1-10 Hz can be obtained with minimal perceptible interference to the viewing audience. For NTSC and PAL recording, the frequency of the interference signal should be chosen such that the absolute value of the difference between the camera take-up frequency and the interference signal frequency is a frequency that renders the distortion perceptible to a human being viewing a playback of the recording.

The frequency and the duty cycle can also be varied dynamically to vary alteration in the recorded image. For example, in FIG. 2, the rate, or frequency, of interfering signal 440 is shown to dynamically change during the frames 310, 320, 330 and 350 of the projected image. The duty cycle of interfering signal 440 is shown as 50 percent. A variation in the duty cycle further randomizes the alteration pattern that is introduced in the projected image and recorded by the video-recording device. The rate of change in the variation of both the frequency and duty cycle of interfering signal 440 can also be randomized within appropriate ranges. This additional randomization of the interfering signal 440 prohibits the removal of the induced alteration pattern, for example, by determining a fixed interfering signal 440 from the alteration pattern and electronically removing the distortion. Dynamic alteration can also be used to maximize the psycho-visual effect of the alteration to the recorded image.

C. Illustrative Systems and Methods

Figure 3A:
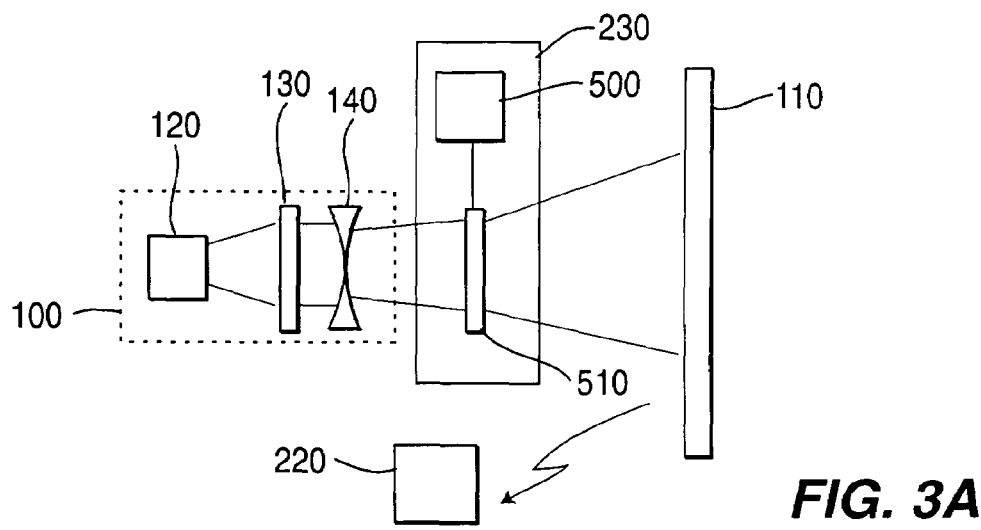
FIGS. 3A to 3C illustrates exemplary embodiments of systems for introducing alterations in a recorded image in accordance with the principles of the invention.

FIG. 3A illustrates an exemplary system for distorting a recorded image. In this embodiment, an interfering source 230 is interposed between the projector 100 and the screen 110. The interfering source 230 includes an interfering element 510, which can be a shutter, filter or other structure for altering the projected image. The interfering source 230 introduces an interference signal, such as the interference signal 440 shown in FIG. 2, into the projected image by controlling the operation of the element 510.

For example, if the element 510 is a shutter, then varying the opening and closing of the shutter aperture generates the interference signal. If the element 510 is a filter, then varying the filtering level for the light passing through the element generates the interference signal. The change in the aperture opening of the shutter or the filtering level can be done mechanically or electronically. The controller 500, to create a variable interference signal, can dynamically adjust the rate, duty cycle and aperture opening. This embodiment can be implemented externally to film and electronic projectors.

Figure 3B:
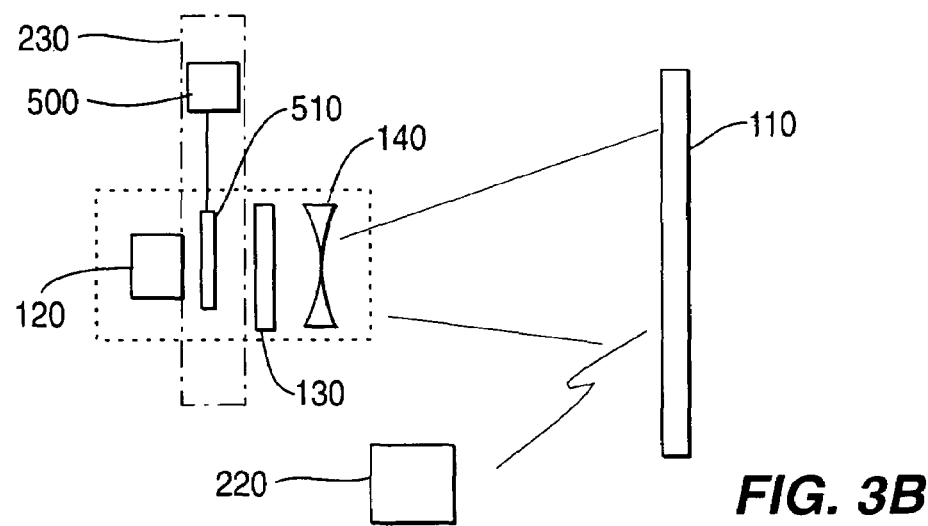

FIG. 3B illustrates a second exemplary system for imperceptibly altering a projected image that is recorded as an altered or distorted image. In this embodiment, the interfering source 230 is placed between the light source 120 and the film 130. The element 510 generates an altered projected image by interrupting the path from the light source 120 to the film 130. The controller 500 controls the duration (duty cycle) of the interruption, the rate of interruption, and the degree of variation in the element 510.

Figure 3C:
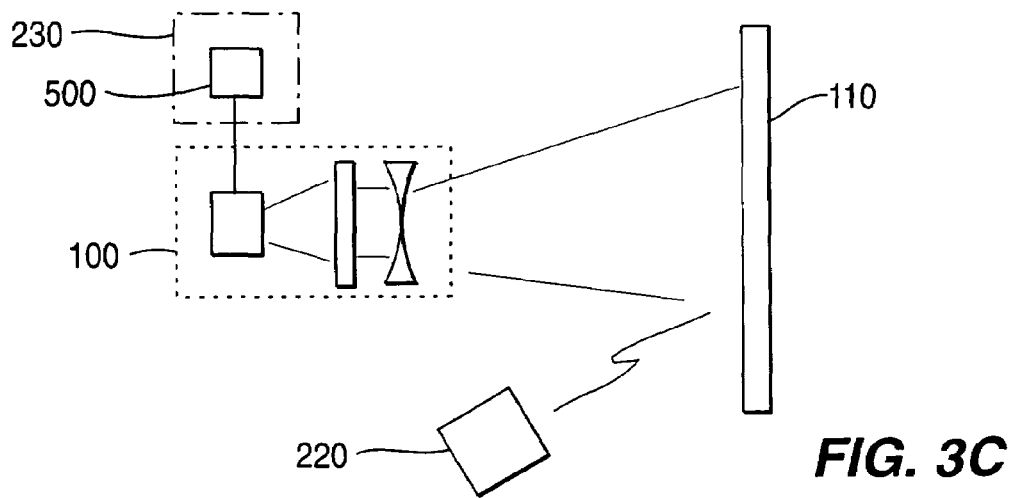

In the system shown in FIG. 3C, the interference is implemented by controlling the light source. The interference source 230 is used to interrupt the light source 120 directly. That is, the controller 500 controls the rate and duration that the light source 120 remains lit. By turning the light source on and off, a blanking pulse can be generated in the projected image.

Figure 4A:
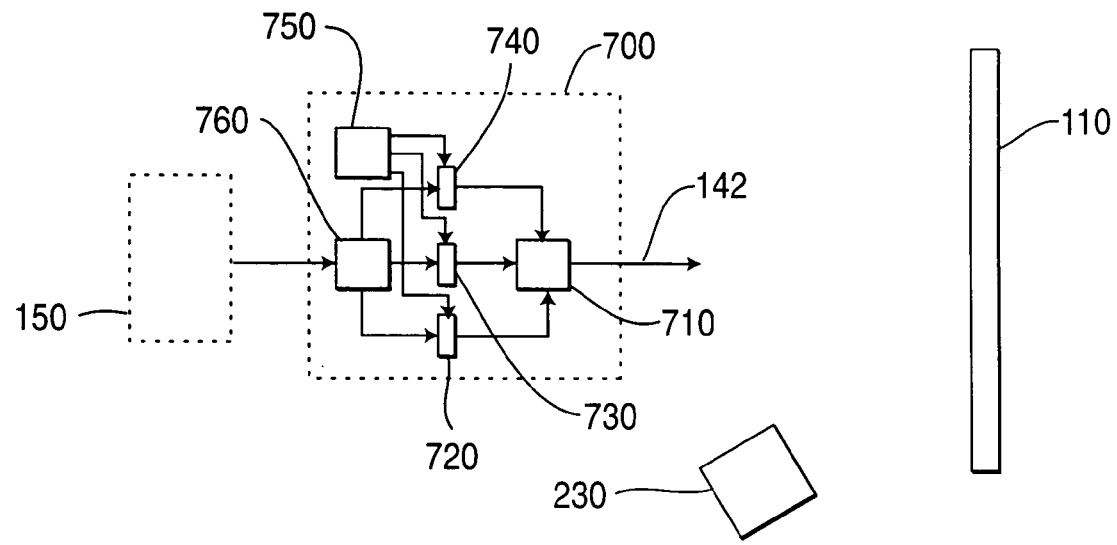
FIG. 4A illustrates an exemplary system for introducing alterations in a recorded image in accordance with the principles of the invention.

FIG. 4A illustrates an exemplary embodiment of the invention for electronic image projectors, where an alteration pattern is produced by introducing interference in selected colors of the projected image. In this embodiment, a variable beat frequency can be developed among selected image colors. The alterations are imperceptible to the audience but are recorded on a video recorder. A projected image, produced by an electronic projector 150, is divided into component image colors, for example red, green and blue, by a splitter 760. Each of the separated colors is then passed through an element that may be a shutter or a filter or a light valve.

These elements are monochromatic and allow the passage of only a single respective color. For example, element 740 may represent a red filter or light valve, element 730 may represent a green filter or light valve and element 720 may represent a blue filter or light valve. These elements control the levels of red, green and blue color added to the image. Similarly, the elements 720, 730 and 740 can be shutters that introduce alterations (such as flicker) in the blue, green and red colors, respectively.

The controller 750 controls a duty cycle and a rate of interference of an appropriately selected element. The controller 750 can cause an alteration in the red component by causing changes in the level of coloration, or by changes in the level of filtering or by interrupting the red component at a rate imperceptible to the viewer. In a similar manner, alterations in the green or blue components can also be induced. The alteration in the selected individual colors can be introduced at different rates and duty cycles. The individually altered color signals are then combined in a combiner 710 and projected onto the screen 110. In this embodiment of the invention, by selectively altering individual image colors, the controller 750 may induce a deficiency in a single color or a plurality of colors when recorded on a video-recording device.

Another method of introducing an interference signal 440 in the projected image is by introducing a change in the timing of the image colors. After splitting the image into component image colors, the individual colors are time-synchronized and operating at a frequency, $f_1$. The colors can be unsynchronized as long as the time averaged intensity levels for the component colors over an interval are balanced. The controller 750 controls the changes to the timing relation among the individual image colors. The controller, for example, can cause red to operate at rate $f_1$, green at rate $f_2$ and blue at rate $f_3$. The recording device records a shift in the color timing of the projected image, because each color sweeps over the frame in one frame time.

The shift in the timing relation among the colors can be on the order of 1 to 20 Hz. For instance, if the record frequency is 60 Hz, modulation of approximately 55 Hz to 65 Hz will induce observable alterations on a recorded copy of the projection. The recording device will have an excess or a deficiency of one or more of the separated colors. A color band will appear to sweep over the recorded image with a period that is the difference of the projected and recording time frames.

An interframe blanking period also can be introduced for each channel. The blanking period can be different or the same for each channel. If the blanking period is different for each channel, the average brightness levels are equalized for the projected image.

Figure 4B:
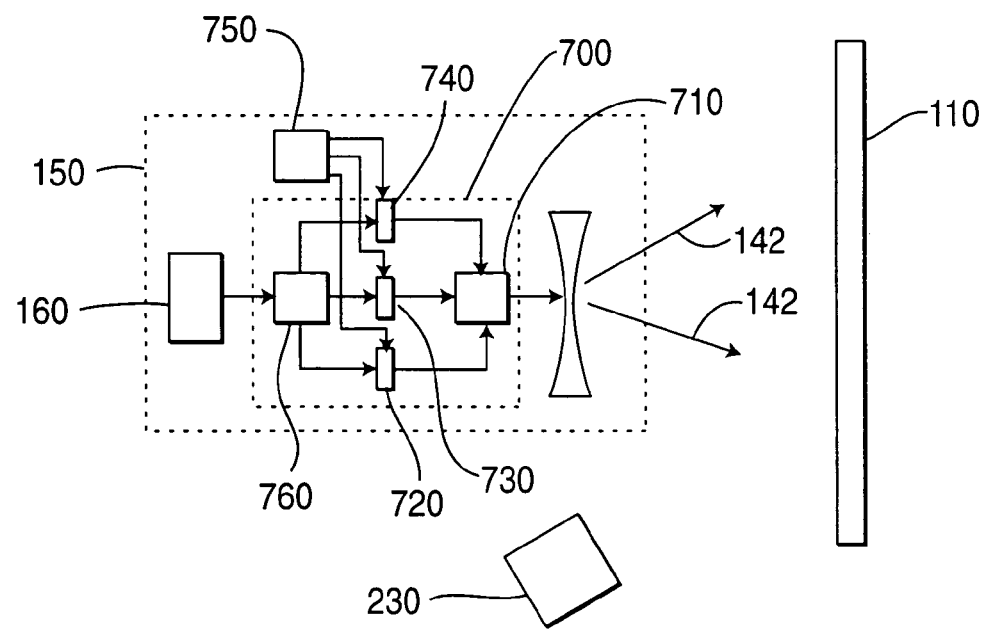
FIG. 4B illustrates another exemplary system for introducing alterations in a recorded image in accordance with the principles of the invention.

FIG. 4B illustrates an exemplary embodiment that can be included within a projector 150. In this embodiment, the image is altered by interfering with the individual color signals or by unsynchronizing the color signals, prior to the projection onto the screen 110. The embodiment illustrated in FIG. 4A can be used as a supplement to existing electronic projectors. The embodiment illustrated in FIG. 4B can be incorporated into the manufacturing process of newer models of electronic projectors.

With regard to digital processors, such as the Digital Light Processor™ (trademark of Texas Instruments), interference patterns similar to those disclosed herein can be introduced by varying the duty cycle of the mirrors within the digital processor. For example, a phase shifted version of the nominal duty cycle can be used to create an image that will appear on a camcorder recording, but that will be invisible to a human observer of the projected image.

Figure 5:
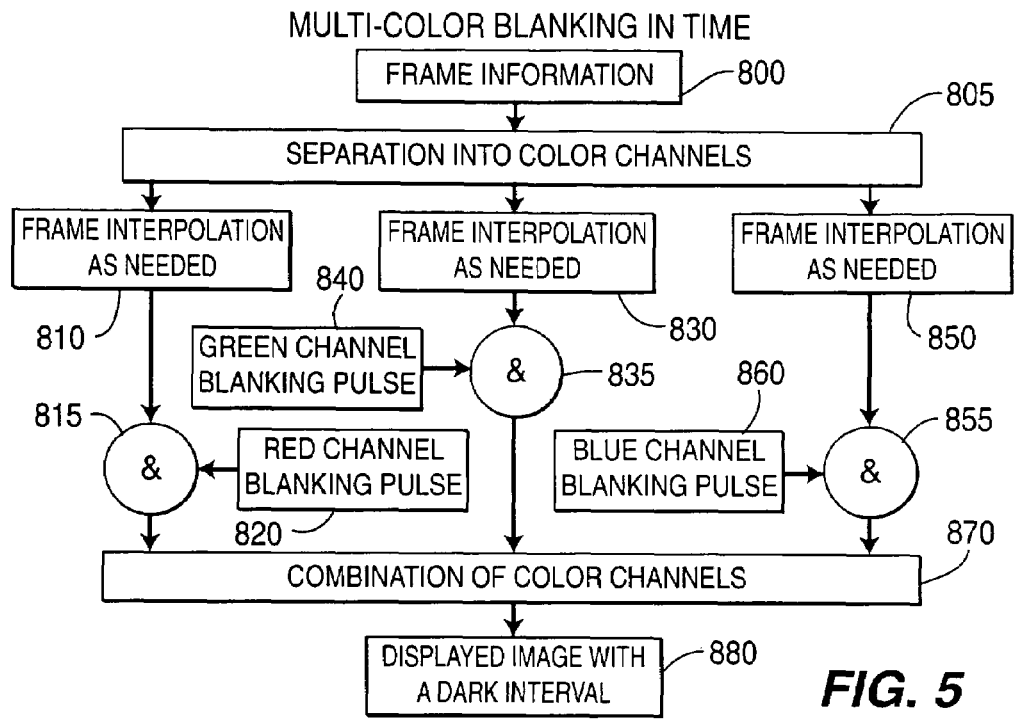
FIG. 5 is a block diagram of an exemplary system for introducing alterations in recorded images.

In FIG. 5, a system for introducing an interference signal in a projected image is shown. In this system, a splitter 805 separates frame information 800 into three component color wavelengths, red, green, and blue. The red wavelength is processed by a frame interpolator 810 and passed to mixer 815. A red channel blanking pulse 820 is imposed on the red color signal in the mixer 815. The altered red color signal is then passed to a combiner 870. Similar processes are applied to the green and blue colors in the interpolators 830 and 850, respectively. Additional blanking signals 840 and 860 are mixed with the respective green and blue colors in mixers 835 and 855. The altered green and blue colors are passed to the combiner 870 where they are combined with the red signal to create a displayed image with a dark interval 880.

In this system, the frame interpolators 810, 830 and 850 can introduce alterations of the appropriate color by varying the aperture of a shutter. Interpolators 810, 830 and 850 can also provide alterations of the appropriate color by using different frame rates in each color field. In this approach, because each color sweeps over the frame in one frame time and because the recording camera integrates over a different time period, the recorded image will have an excess or a deficiency of one or more of the colors. A colored band will appear to be sweeping over the recorded image with a period that is the difference of the projected and recorded frame times.

Figure 6:
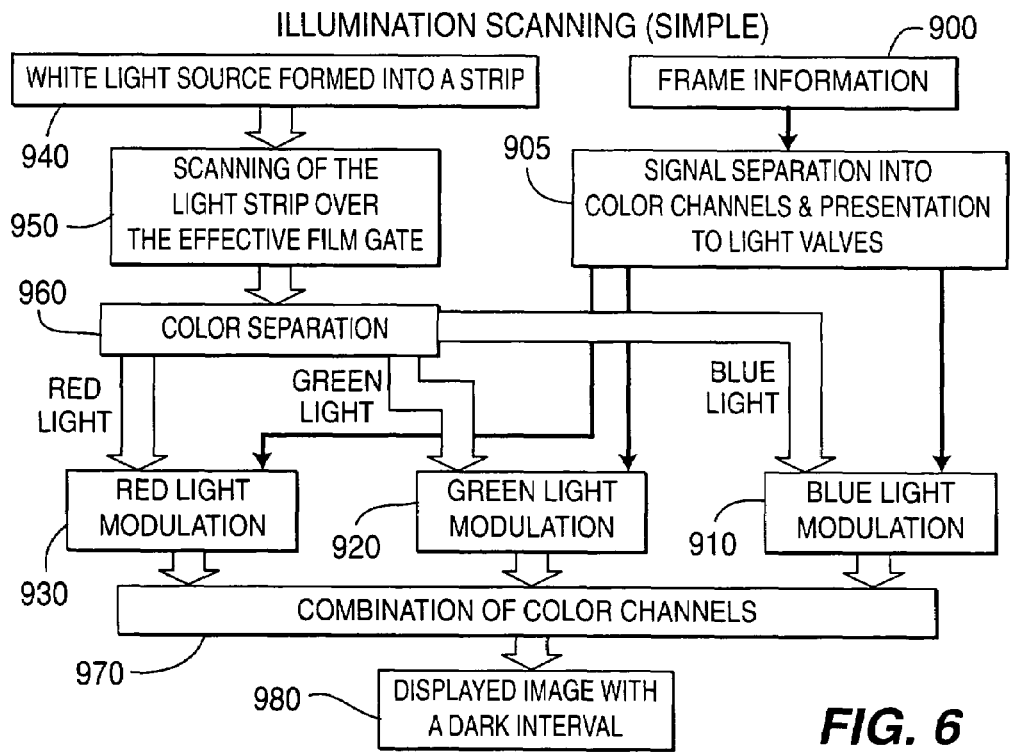
FIG. 6 illustrates an exemplary system for introducing alterations in recorded images.

FIG. 6 illustrates an exemplary system for introducing alteration in the projected image using a white light source and a scanner. The frame information 900 is separated into red, green and blue colors. Each color is passed to a respective color modulator,—i.e., the red image color to a red modulator 930, the green image color to a green modulator 920, and the blue image color to a blue modulator 910. An interfering signal is generated by forming a white light source into a strip 940 and scanning the light strip over an effective film gate with a scanner 950. The color separator 960 separates the scanned light strip into corresponding component colors (red, green and blue). The component colors are then applied to the corresponding color modulator to induce an alteration in the respective frame image color. The altered image colors are then combined in a combiner 970 to form a displayed image with a dark interval 980.

Figure 7:
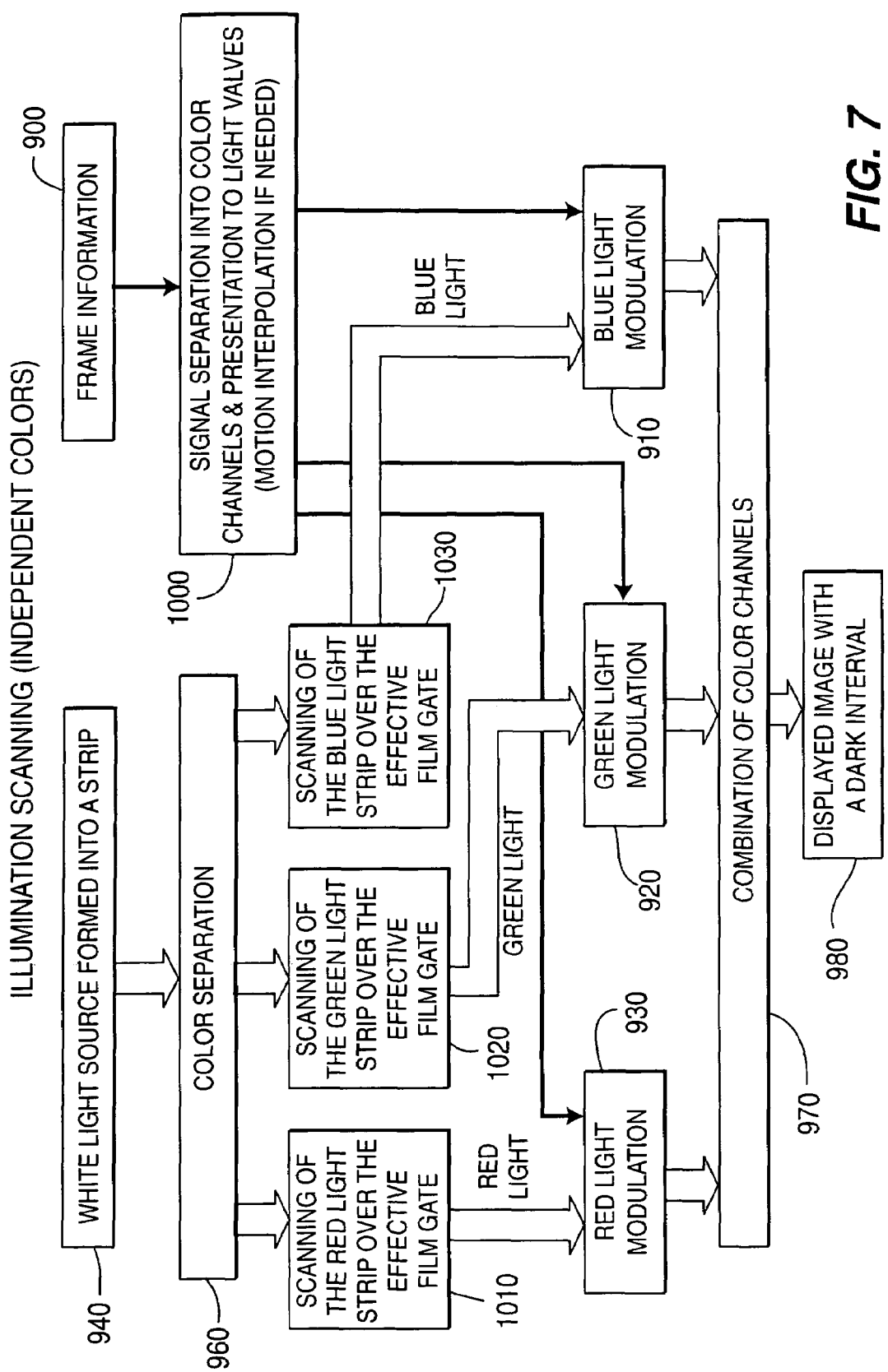
FIG. 7 illustrates an exemplary system for introducing alterations in recorded images.

FIG. 7 illustrates another exemplary system for altering a projected image in accordance with the principles of the invention. A separator 1000 separates the frame information 900 into red, green and blue. (Motion interpolation to align the colors for superposition may be necessary.) Each color is then passed to a respective color modulator (red modulator 930, green modulator 920 and blue modulator 910). An interfering signal is generated by forming a white light source into a strip 940. The scanned white light strip is then separated into corresponding color components by a color separator 960. Each interfering color strip is then scanned over the effective film gate by the appropriate scanning element (red element 1010, green element 1020 and blue element 1030), and applied to the color modulators (red modulator 930, green modulator 920, and blue modulator 910). A combiner 970 combines the altered image colors and a displayed image appears with a dark interval 980.

Figure 8:
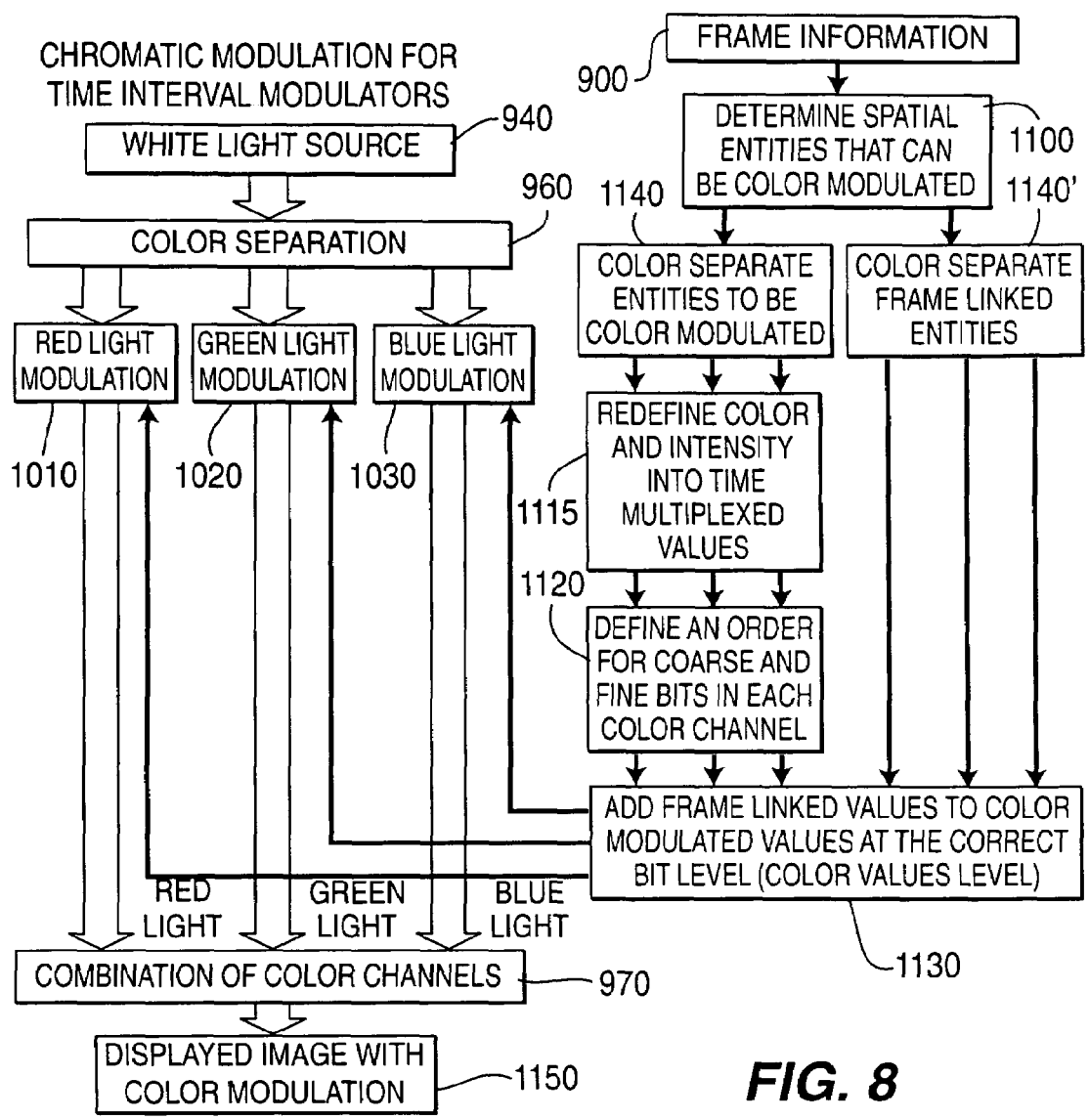
FIG. 8 illustrates an exemplary system for introducing alterations in a recorded image.

In FIG. 8, a system for altering a projected image using chromatic modulation of the image on a time basis is shown. In this system, an image splitter 1100 separates the frame information 900 into frame-dependent (frame-linked) and frame-independent entities. An entity need not be a physical image in the frame. In pyramid processing, for example, an entity can be a level in the resolution decimation. A spatial entity, for another example, is an area in the image defined by some algorithm. Generally, an entity has a lifetime of a plurality of frames.

A separator 1140 separates the colors in the frame-independent and frame-linked entities. For the frame independent entities, the separate signals are redefined with time-multiplexed values by a processor 1115. An order of presentation of coarse and fine bits is defined for each color 1120. For instance, in one color channel a first frame of a frame pair can have coarse (wide time interval) intensity data presented at the end of the frame, while the subsequent frame has coarse data presented at the beginning of the frame. The frame pair for the second color channel can have its coarse data presented in reverse order. Bright data and dim data can be effectively clustered while maintaining average intensity values. A processor 1130 then combines this presentation data with the color-separated frame-linked entities.

Also in this exemplary system, a white light source 940 provides white light to a separator 960, which splits the white light 940 into component colors. A red modulator 1010, green modulator 1020 and blue modulator 1030 are responsive to these component colors and to the frame-linked and frame-independent entities and modulate the separated color image data for the spatial entities. The modulated color image data is combined by the combiner 970, resulting in a displayed image with color modulation 1150.

Figure 9:
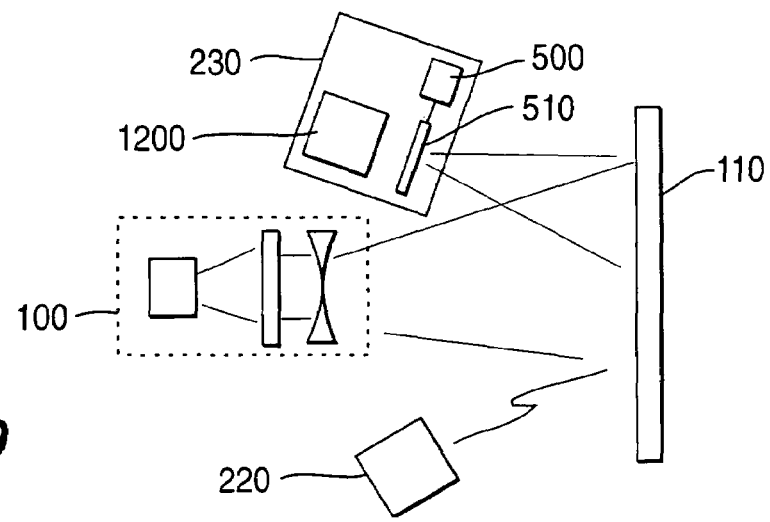
FIG. 9 illustrates an exemplary system for distorting a recorded image in accordance with the principles of the invention.

FIG. 9 illustrates another exemplary system for altering a projected image. In this system, the projected image is displayed uninterrupted. An interfering source 230 directs an alteration pattern onto the screen 110. The pattern is imperceptible to a viewer but is recorded by a video recording device. The interfering source 230 includes a light source 1200, an interfering element 510 and a controller 500. The controller 500 controls the interfering element 510, causing, for example, the opening and closing of a shutter aperture to interrupt light projected from the light source 1200. The interfering pattern created by the interrupted light source 1200 biases the projected image by adding an ambient light level to the projected image.

The light source 1200 need not provide light in the visible light range, but can operate in a range that is above or below the range of the human eye or in a region of visual insensitivity. For example, the light source 1200 may operate in an infrared region (700 nm and longer), a deep red region (590 nm and longer) or blue region (480 nm and shorter). These light regions, although invisible to the eye, cause the video recorder to measure the projected image at a higher level of brightness. As a result, the aperture of the video recorder is reduced, and the recorded image is rendered darker than the originally projected image.

Further, the image projected by the interfering source 230 may not only introduce an alteration in the projected image, but also introduce a more stable image, such as the date and location of the presentation. This information, typically referred to as a watermark, is useful in determining the source of a recorded image.

In another embodiment, the light source 1200 may also operate as a strobe light to introduce an alteration pattern in the projected image. The strobe light has a similar effect as operating the aperture of a shutter. For example, for a record rate of 60 Hz, a strobe light operating at a rate of 67 Hz produces a recorded distortion at a temporal beat frequency of 7 Hz. The strobe light may be any of the light ranges discussed previously.

As would be understood the principles of the invention disclosed are related to introducing alterations or distortions in film and video content as a method of rendering illegally obtained copies of the materials unpleasant to view. The principles of the invention may also be applied to other forms of content on other media, such as DVD and DVDX.

The examples given herein are presented to enable those skilled in the art to more clearly understand and practice the invention. The examples should not be considered as limitations upon the scope of the invention, but as merely illustrative. Numerous modifications and alternative embodiments of the invention will be apparent to those skilled in the art in view of the foregoing description.

What is claimed is:

1. A method for distorting a recording of projected images, the recording having a frame frequency, the method comprising the steps of:
  without varying the frame frequency of the projector, imposing an interference on the projected images at a frame rate frequency that renders the interference imperceptible to a human viewer;
  wherein a difference between the interference frame rate frequency and the recording frame frequency is perceptible to a human;
  wherein the interference is characterized by a plurality of parameters, the parameters being selected from the group comprising duty cycle, frequency, amplitude, presentation order and wavelength; and
  varying at least one of the parameters.

2. The method of claim 1 wherein the step of imposing an interference includes the step of interrupting a projection of the projected images, wherein the plurality of parameters further includes the rate of interruption.

3. The method of claim 1 wherein the step of varying at least one of the parameters includes the step of dynamically varying at least one of the parameters.

4. The method of claim 1 wherein the interference comprises projected light.

5. A method for distorting a recording of projected images, the recording having a frame frequency, the method comprising the steps of:
  without varying the frame frequency of the projector, imposing an interference on the projected images at a frame rate frequency that renders the interference imperceptible to a human viewer;
  wherein a difference between the interference frame rate frequency and the recording frame frequency is perceptible to a human, and
  wherein the imposing step includes the steps of:
    scanning a white light strip;
    separating the white light strip into color light strips;
    separating spatial entities into component colors; and
    modulating the component colors.

6. A method for distorting a recording of projected images, the recording having a frame frequency, the method comprising the steps of:
  without varying the frame frequency of the projector, imposing an interference on the projected images at a frame rate frequency that renders the interference imperceptible to a human viewer;
  wherein a difference between the interference frame rate frequency and the recording frame frequency is perceptible to a human; and
  separating the projected images into a plurality of colors, wherein the imposing step includes the further step of modulating at least one of the plurality of colors by changing a time relationship of the at least one color with respect to at least one other of the plurality of colors.

7. The method of claim 6 wherein the step of modulating the at least one color includes blanking the at least one color for an interval.

8. A method for operating a motion picture projector having a projector frame frequency, comprising the steps of:
  without varying the projector frame frequency, determining a recording device frame frequency; and
  blanking a projected image at a humanly imperceptible blanking frame rate frequency, wherein a difference between the frame frequency and the blanking frame rate frequency is a humanly perceptible frame frequency,
  wherein the blanking of the projected image is characterized by a plurality of parameters, the parameters being selected from the group comprising duty cycle, frequency, amplitude, presentation order and wavelength; and
  varying at least one of the parameters.

9. A projection system for distorting a recording of projected images, the recording having a frame frequency, the system comprising:
  an interfering element including a separator for separating image data into a plurality of colors; and
  a controller coupled to the interfering element, wherein the controller, without varying the projector image frame frequency, causes the interfering element to impose an alteration on the projected images at a humanly imperceptible frame rate,
  wherein a playback of a recording of the projected images displays humanly perceptible alterations, and
  wherein the controller is further operable to cause the interfering element to vary a plurality of parameters, at least one of the plurality of parameters being selected from the group comprising duty cycle, frequency, amplitude, brightness, intensity, presentation order and wavelength.

10. The system of claim 9 wherein the interfering element includes one selected from the group comprising a shutter, a filter, a light valve and a lens.

11. The system of claim 9 wherein the interfering element includes:
  a separator responsive to image data and operable to separate the image data into a plurality of colors; and
  a color modulator responsive to the controller and operable to adjust at least one of the plurality of parameters for at least one of the colors;
  the system further comprising a combiner coupled to the interfering element and operable to combine the image data for projection.

12. The system of claim 10 wherein the interfering element further includes:
  a light source operable to provide a light strip;
  a color separator operable to separate the light strip into colors light strips; and
  a scanner for scanning the color light strips over a frame, wherein the color modulator varies the parameters over the color light strips.

13. The system of claim 12 wherein the modulator varies a projection rate of the color light strips over the frame.

14. The system of claim 9 wherein the interfering element includes a light source operable to project an image.

15. A projection system for distorting a recording of projected images, the recording having a frame frequency, the system comprising:
  an interfering element including a separator for separating image data into a plurality of colors; and
  a controller coupled to the interfering element, wherein the controller, without varying the projector image frame frequency, causes the interfering element to impose an alteration on the projected images at a humanly imperceptible frame rate, wherein a playback of a recording of the projected images displays humanly perceptible alterations,
  a white light source for providing white light; and
  a detector for determining spatial entities for color modulation, the interfering element including:
a color separator for color separating the white light and the spatial entities for color modulation into component colors;
a time multiplexer for varying parameters of the component colors of the spatial entities for color modulation;
a processor for defining an order of coarse bits and of fine bits for at least one of the component colors of the spatial entities for color modulation;
a modulator for modulating the white light component colors and the component colors of the spatial entities for color modulation, the modulator providing modulated component colors; and
a combiner for combining the modulated component colors.

16. The system of claim 15 wherein the detector determines frame-linked spatial entities, the separator operable to separate the frame-linked spatial entities into component colors, and the modulator operable to modulate the component colors of the frame-linked spatial entities.

* * * * *